(12) United States Patent
Yun et al.

(10) Patent No.: US 9,207,318 B2
(45) Date of Patent: Dec. 8, 2015

(54) DAMAGE PROXY MAP FROM INTERFEROMETRIC SYNTHETIC APERTURE RADAR COHERENCE

(75) Inventors: Sang-Ho Yun, La Canada Flintridge, CA (US); Eric Jameson Fielding, Pasadena, CA (US); Frank H. Webb, Pacific Palisades, CA (US); Mark Simons, Altadena, CA (US)

(73) Assignee: California Institute of Technology, Pasadena, CA (US)

( * ) Notice: Subject to any disclaimer, the term of this patent is extended or adjusted under 35 U.S.C. 154(b) by 508 days.

(21) Appl. No.: 13/528,610

(22) Filed: Jun. 20, 2012

(65) Prior Publication Data

US 2012/0319893 A1     Dec. 20, 2012

Related U.S. Application Data

(60) Provisional application No. 61/498,755, filed on Jun. 20, 2011.

(51) Int. Cl.
*G01S 13/90*     (2006.01)

(52) U.S. Cl.
CPC .................................. *G01S 13/9023* (2013.01)

(58) Field of Classification Search
CPC .................................................. G01S 13/9023
USPC ........................................................... 342/25
See application file for complete search history.

(56) References Cited

U.S. PATENT DOCUMENTS

2005/0025357 A1*    2/2005    Landwehr et al. ............ 382/170

OTHER PUBLICATIONS

Auer et al., "Ray-Tracing Simulation Techniques for Understanding High-Resolution SAR Images". IEEE Transactions on Geoscience and Remote Sensing, vol. 48, No. 3, Mar. 2010, pp. 1445-1456.

Booth et al., "Validating assessments of seismic damage made from remote sensing". Earthquake Spectra, vol. 27, No. S1, Oct. 2011, pp. S157-S177.

Brunner et at., "Earthquake Damage Assessment of Buildings Using VHR Optical and SAR Imagery," IEEE Transactions on Geoscience and Remote Sensing, vol. 48, No. 5, May 2010, pp. 2403-2420.

Coltuc et al., "Exact histogram specification." IEEE transactions on image processing, vol. 15, No. 5, May 2006, pp. 1143-1152.

Corbane, "A comprehensive analysis of building damage in the Jan. 12, 2010 Mw 7 Haiti earthquake using high-resolution satellite and aerial imagery," Photogrammetric Engineering and Remote Sensing, vol. 77, No. 10, 2011, pp. 997-1009.

(Continued)

*Primary Examiner* — Timothy A Brainard
(74) *Attorney, Agent, or Firm* — Gates & Cooper LLP

(57) ABSTRACT

A method, apparatus, and article of manufacture provide the ability to generate a damage proxy map. A master coherence map and a slave coherence map, for an area prior and subsequent to (including) a damage event are obtained. The slave coherence map is registered to the master coherence map. Pixel values of the slave coherence map are modified using histogram matching to provide a first histogram of the master coherence map that exactly matches a second histogram of the slave coherence map. A coherence difference between the slave coherence map and the master coherence map is computed to produce a damage proxy map. The damage proxy map is displayed with the coherence difference displayed in a visually distinguishable manner.

16 Claims, 13 Drawing Sheets

(56) References Cited

OTHER PUBLICATIONS

Dell'acqua et al., "Earthquake damages rapid mapping by satellite remote sensing data: L'aquila Apr. 6, 2009 event". IEEE Journal of Selected Topics in Applied Earth Observation and Remote Sensing, vol. 4, No. 4, Dec. 2011, pp. 935-943.

Dietterich et al., "Tracking lava flow emplacement on the east rift zone of Kilauea, Hawaii, with synthetic aperture radar coherence". Geochemistry, Geophysics, Geosystems, vol. 13, No. 5, May 2012, pp. 1-17.

Fielding et al., "Surface ruptures and building damage of the 2003 Bam, Iran, earthquake mapped by satellite synthetic aperture radar interferometric correlation," Journal of Geophysical Research, vol. 110, 2005, No. B03302, pp. 1-15.

Ghosh et al., "Crowdsourcing for rapid damage assessment: The global earth observation catastrophe assessment network (GEO-CAN)". Earthquake Spectra, vol. 27, No. S1, Oct. 2011, pp. S179-S198.

Guida et al., "Model-based interpretation of high-resolution SAR images of buildings". IEEE Journal of Selected Topics in Applied Earth Observation and Remote Sensing, vol. 1, No. 2, Jun. 2008, pp. 107-119.

Hoffmann, "Mapping damage during the Bam (Iran ) earthquake us-ing interferometric coherence". International Journal of Remote Sensing, vol. 28, No. 6, 2007, pp. 1199-1216.

Kerle, "Remote sensing based post-disaster damage mapping—ready for a collaborative approach?" IECO/IEEE-Earthzine, Mar. 23, 2011, URL: http://www.earthzine.org/2011/03/23/remote-sensing-basedpost-disaster-damage-mapping-%E2%80%93-ready-for-acollaborative-approach.

Simons et al., "Coseismic deformation from the 1999 mw 7.1 hector mine, California, earthquake as inferred from INSAR and GPS observations". Bulletin of the Seismological Society of America, vol. 92, No. 4, May 2002, pp. 1390-1402.

Zebker et al., "Decorrelation in Interferometric Radar Echoes," IEEE Transactions on Geoscience and Remote Sensing, vol. 30, No. 5, Sep. 1992, pp. 950-959.

Zebker et al., "Analysis of active lava flows on Kilauea volcano, Hawaii, using SIR-C radar correlation measurements," Geology, vol. 24, No. 6, 1996, pp. 495-498.

* cited by examiner

DAMAGE PROXY MAP FROM INTERFEROMETRIC SYNTHETIC APERTURE RADAR COHERENCE

CROSS-REFERENCE TO RELATED APPLICATIONS

This application claims the benefit under 35 U.S.C. Section 119(e) of the following commonly-assigned U.S. provisional patent application(s), which is/are incorporated by reference herein:

Provisional Application Ser. No. 61/498,755, filed on Jun. 20, 2011, by Sang Ho Yun, Eric J. Fielding, Frank H. Webb, and Mark Simons, entitled "Damage Proxy Map from InSAR Coherence,".

STATEMENT REGARDING FEDERALLY SPONSORED RESEARCH AND DEVELOPMENT

The invention described herein was made in the performance of work under a NASA Contract, and is subject to the provisions of Public Law 96-517 (35 USC 202) in which the contractor has elected to retain title.

BACKGROUND OF THE INVENTION

1. Field of the Invention

The present invention relates generally to damage assessment, and in particular, to a method, apparatus, and article of manufacture for generating a damage proxy map from radar signals.

2. Description of the Related Art (Note: This application references a number of different publications as indicated throughout the specification by reference numbers enclosed in brackets, e.g., [x]. A list of these different publications ordered according to these reference numbers can be found below in the section entitled "References." Each of these publications is incorporated by reference herein.)

Major earthquakes cause buildings to collapse, often claiming the lives of many. When a major earthquake hits an area with significant human population, a critical component of the situational awareness for rescue operations and disaster size estimation is rapid, accurate, and comprehensive detection of building damage. Thus, spaceborne and airborne remote sensing technique is crucial. So far, private companies and government agencies have been mostly manually interpreting high-resolution optical images acquired before and after the earthquake to create damage maps, and automation of this process is still an active research area.

Radar remote sensing has a few advantages when compared to optical sensors: 1) it does not require sunlight; 2) there is no cloud cover in radar image (clouds are transparent to radar); and 3) coherence character of a radar signal makes it highly sensitive to surface scattering property change. For this reason, interferometric synthetic aperture radar (InSAR) coherence differencing has been tested for its usefulness to generate damage maps of urban areas hit by a major earthquake. However, it turns out that perpendicular and temporal baselines of interferometric pairs need to almost be the same in order for the technique to be useful.

To better understand these problems, a detailed description of damage assessment requirements and interferometric coherence may be useful.

Damage Assessment Requirements

Earthquakes of significant magnitude cause buildings to collapse, often claiming the lives of many. For example, the 2010 $M_w$ 7.0 Haiti earthquake killed about 230,000 people, with large uncertainty in the death toll, causing about 280,000 buildings to collapse or be severely damaged [1]. The 2003 $M_w$ 6.6 Bam earthquake in Iran killed at least 26,000 people, about 27% of the population of the city of Bam [2]. More recently, the February 2011 $M_w$ 6.3 Christchurch earthquake killed 185 people and caused a wide range of building damage and extensive liquefaction damage with about 400,000 tons of silt. The 2011 M9.0 Tohoku-oki earthquake and the triggered tsunami damaged over one million buildings, leaving more than 15,000 people dead [3], [4]. The majority of casualties are in cities, but the extent of damage to smaller towns and villages can be even more difficult to assess, especially on short time scales, because communications networks are frequently damaged and ineffective.

When a major earthquake hits an area with significant human population, a rapid, accurate, and comprehensive assessment of building damage is needed for timely situational awareness for rescue operations and loss estimation. Thus, space-borne and airborne remote sensing techniques can play a critical role. However, operational use of remote sensing data for disaster response, especially for earthquakes, volcanic eruptions, landslides, and tsunamis, has not yet been effectively put into practice. Academia, private companies, government agencies, and international responding organizations have mostly relied on high-resolution optical [5] and radar imagery to create damage assessment maps using image processing and classification algorithms [6]. Recently, a crowd sourcing approach was tested using high-resolution optical imagery analyzed by a group of trained experts for post-disaster damage mapping of the 2010 $M_w$ 7.0 Haiti earthquake [7]. However, automation of these processes is still an active research area, and an optimal methodology both for the mapping and the subsequent data integration and processing has yet to be developed [8].

Radar remote sensing has some advantages over optical remote sensing: 1) adar does not require sunlight, 2) clouds are transparent to radar signal, and 3) coherent character of radar makes it highly sensitive to surface property change. For these reasons, the use of synthetic aperture radar (SAR) and interferometric SAR (InSAR) have been explored by many groups. Brunner et al. (2010) used the similarity between post-event SAR images and predicted a SAR signature derived from pre-event high-resolution optical imagery [9]. 3-D model based ray tracing can also be used to simulate high-resolution reflectivity maps [10], [11]. These techniques have potential to improve the quality of SAR-based damage assessment. However, the model requires ground truth measurements or independent remote sensing data such as LiDAR (light detection and ranging) measurements.

Coherence from repeat pass interferometry provides a quantitative measure of ground surface property change during the time span of the interferometric pair. Major damage to a building significantly increases the interferometric phase variance in the impacted resolution element. This change shows up as a decorrelation, or a decrease in coherence. Zebker et al. (1996) recognized the use of InSAR coherence to detect ground surface change due to lave flow on Kilauea volcano observed with Space Shuttle Imaging Radar-C (SIR-C) [12], and Dietterich et al. (2012) used coherence images from multiple tracks of Envisat satellite to track lava flow decorrelation on Kilauea volcano [13]. Simons et al. (2002) used decorrelation from ERS radar data as a tool for mapping surface rupture and ground surface disturbance from intense shaking during the 1999 $M_w$ 7.1 Hector Mine earthquake [14], and Fielding at al. (2005) used coherence changes to map surface ruptures and damage to the city of Bam, Iran from the 2003 Bam earthquake [15].

Building damage is often much more localized than lava flow and surface rupture. Moreover, damaged buildings are often surrounded by other decorrelation sources such as changes in vegetation during the time span of interferometric pair. This background variability makes it difficult to isolate building damage decorrelation in a single coherence map. One way to reduce such noise is to take the difference [15] or ratio [16] of two coherence maps. However, these approaches work only under a special condition when the two coherence images contain similar amount of the background noise decorrelation, a condition that can be achieved when the perpendicular and temporal baselines of two interferometric pairs are almost the same [15].

The perpendicular baseline that causes geometric decorrelation varies from one interferometric pair to another, although the decorrelation can be mitigated with range spectral filtering at the expense of range resolution when volume scattering is negligible [17]. Temporal decorrelation occurs everywhere at various rates, and the Doppler centroid changes at every data acquisition. Volume scattering causes different amounts of decorrelation depending on perpendicular and temporal baselines [18]-[20]. A recent study by Lavalle et al. (2011) provided theoretical explanation on the coupling of temporal decorrelation and vertical structure of vegetation, implying that it is not possible to decouple temporal and volumetric decorrelation of vegetation [21]. These inherent couplings of different decorrelation sources challenge the ability to isolate coherence change due to building damage.

Interferometric Coherence

Interferometric coherence, a measure of similarity between two radar echoes, has been used to estimate the quality of InSAR data. This statistical quantity is calculated as $$\gamma = \frac{|\langle c_1 c_2^* \rangle|}{\sqrt{\langle c_1 c_1^* \rangle \langle c_2 c_2^* \rangle}}, 0 \leq \gamma \leq 1 \quad (1)$$

where $c_1$ and $c_2$ are complex pixel values of two SAR images coregistered, and $\langle \ \rangle$ denotes ensemble average, an average over multiple realizations of a random variable, but practically calculated with spatial average assuming ergodicity [20]. Without the absolute value notation, the quantity is called complex correlation (or coherence) function, a coherent sum of interferogram weighted with the product of the root mean square of the amplitude of two SAR images [22]. The term correlation refers to mathematical similarity, whereas coherence refers to physical similarity. As used herein, the term coherence is used as the magnitude of the complex correlation function.

The coherence is determined by many factors such as radar systems, imaging geometry, ground surface property change, and InSAR processing methods. The dependency of coherence on each parameter is known to be multiplicative and can be written as:

$$\gamma = \gamma_{B_p} \gamma_{B_t} \gamma_{B_f} \gamma_{B_V} \gamma_{B_K} \gamma_{B_P} \quad (2)$$

where $\gamma_B$'s are coherences due to baselines (perpendicular, temporal, and spectral, respectively), $\gamma_V$ is due to volume scattering, $\gamma_K$ is due to system thermal noise, and $\gamma_P$ represents coherence due to processing, such as image focusing, coregistration, and interpolation. Each term takes a value between 0 and 1, and any process that decreases the coherence is called decorrelation, defined as $1-\gamma_X$, where X is $B_p$, $B_t$, $B_f$, V, K, or P [23].

When an earthquake causes buildings to collapse, the property of microwave scattering at the buildings changes. This change causes a decrease in coherence, which appears as an additional term $\gamma_D$ (i.e. coherence due to earthquake damage) multiplied to the original coherence. What is needed is the ability to spatially isolate the damaged areas ($\gamma_D<1$) from undamaged areas ($\gamma_D=1$), so that DPMs (Damage Proxy Maps) can be reliably produced from radar images following major earthquakes or other natural or anthropogenic disasters.

SUMMARY OF THE INVENTION

Embodiments of the invention provide a methodology that produces reliable damage proxy maps of building damage using InSAR coherence even in the presence of other decorrelation sources that are coupled to each other. The processed image of coherence change is referred to herein as a DPM, because it is derived from remotely sensed data without ground truth validation.

The methodology produces robust damage maps despite the different perpendicular and temporal baseline conditions, using histogram matching and causality constraints. Three radar images are used to make two pairs of interferometric coherence maps, one pair before the damage (master pair) and the other pair spanning the damage (slave pair). The radar image processing is done using ROI PAC (Repeat Orbit Interferometry PACkage), an InSAR processing software package available from the assignee of the present invention or other InSAR processing software. The slave coherence map is registered to the master coherence map using cross-correlation of their amplitude images. Then the pixel values of the slave coherence map are modified using a histogram-matching algorithm, so that the histogram of the slave coherence exactly matches that of the master coherence. A causality constraint is applied to suppress background clutter. The resulting damage map is transformed onto a georeferenced coordinate system and overlaid on top of a virtual mapping and geographic information program (e.g., Google™ Earth) for easy interpretation.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

Figure 1:
FIG. 1 shows a demolition site in Pasadena, Calif., where building demolition and construction records are maintained by the city and available to the public in accordance with one or more embodiments of the invention.

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

Embodiments of the invention provide a methodology that produces robust damage maps. As an example, embodiments of the invention were used to detect a building demolition project in downtown Pasadena, where 2.5 building blocks were demolished for new apartment complex. The results show clear detection of the demolition site both in space and in time. The anomalous signal starts showing up immediately after the building demolition began and clearly shows up as red blobs in the damage map. During the demolition period, the signal-to-noise ratio at the demolition site increased about 100 times. The developed methodology produced about 150% higher SNR on average, compared to conventional simple coherence differencing.

In addition, the methodology was also used to detect other demolition and construction sites in Pasadena with high fidelity. In this regard, ten (10) out of twelve (12) strong signals turn out to be associated with building demolition and construction. The detected changes show a wide range of size, including campus renovation of Pasadena City College and a room expansion of an individual house. The performance of detection and changes due to demolition and construction were confirmed with a virtual map and imaging system (e.g., Google™ Earth) using optical images with a time slider and records at City of Pasadena. The developed methodology was also applied to Christchurch area, a real damage site hit by the M6.3 Christchurch earthquake in February 2011. The results show clear detection of extensive liquefaction damages as well as building damages and landslide reported in major media. The methodology is being applied to M9.0 Tohoku, Japan earthquake and producing damage maps of tsunami inundation.

One or more aspects of novelty may include the use of a histogram matching algorithm and the application of a causality constraint. Perpendicular and temporal baselines vary from pair to pair, and it is generally unlikely to have two pairs that have both perpendicular and temporal baselines almost the same. Although researchers have suggested theory- and experiment-driven expressions of coherence as a function of perpendicular and temporal baselines, the relationships are not robust enough to be used to adjust arbitrary slave coherence. Since conventional histogram matching algorithms only work for unsigned integer gray scale images, whereas coherence pixels have floating point numbers, a new histogram-matching methodology was developed for this work. The histogram matching of the invention guarantees that the slave coherence pixel values have exactly the same statistics of that of master coherence. The performance of a damage map is not as sensitive to the baseline conditions any more, and the results have significantly higher SNR (signal-to-noise radio) than standard methods can produce. Histogram matching also removes biases in coherence difference, which enables stacking and time series analysis of damage maps. It also enables application of a causality constraint that removes all negative changes (larger changes in the master pair than in the slave pair), which earthquakes are not likely to cause. The time series analysis of a damage map enables the development of an enhanced methodology, as the temporal behavior of each pixel can be characterized in coherence difference.

In one or more embodiments of the invention, the methodology is focused on spatial characterization to detect damages. Understanding the past history of coherence values of each pixel further improves the SNR thereby minimizing the false alarm rate.

Data Overview

One of the difficulties in validating the reliability of a remote sensing-based damage assessment methodology is the lack of detailed ground truth records. For this reason, before the methodology is applied to actual disaster sites, embodiments of the invention were tested with a building demolition site, descriptions of which are described herein. Such a demolition project may be considered a "controlled experiment" and a proxy for earthquake damage.

FIG. 1 shows a demolition site in Pasadena, Calif., where building demolition and construction records are maintained by the city and available to the public. The demolition project was carried out for a new apartment complex in downtown Pasadena. The rectangle 100 indicates the area affected by the demolition project. The site is composed of three building blocks, whose total dimension is 400 m(NS)×150 m (EW). The demolition started on Apr. 23, 2007 and continued for nine months until Jan. 22, 2008.

24 PALSAR (phased array type L-band synthetic aperture radar) data of fine beam mode (i.e. strip-map mode) from the Japanese satellite ALOS (advanced land observing satellite) was used. The distribution of perpendicular baselines of the scenes used (vs. date) are plotted in FIG. 2. Solid and open circles indicate single and dual polarization, respectively. The large black dot indicates the master scene (2008 Feb. 15), and the thick line connecting it to a slave scene (2006 Dec. 31) indicates the master pair. The thin line connecting the master scene and a slave scene (2008 Feb. 18) spans the demolition period. The solid and dashed vertical lines represent the beginning and the end of the demolition project, respectively.

Figure 2:
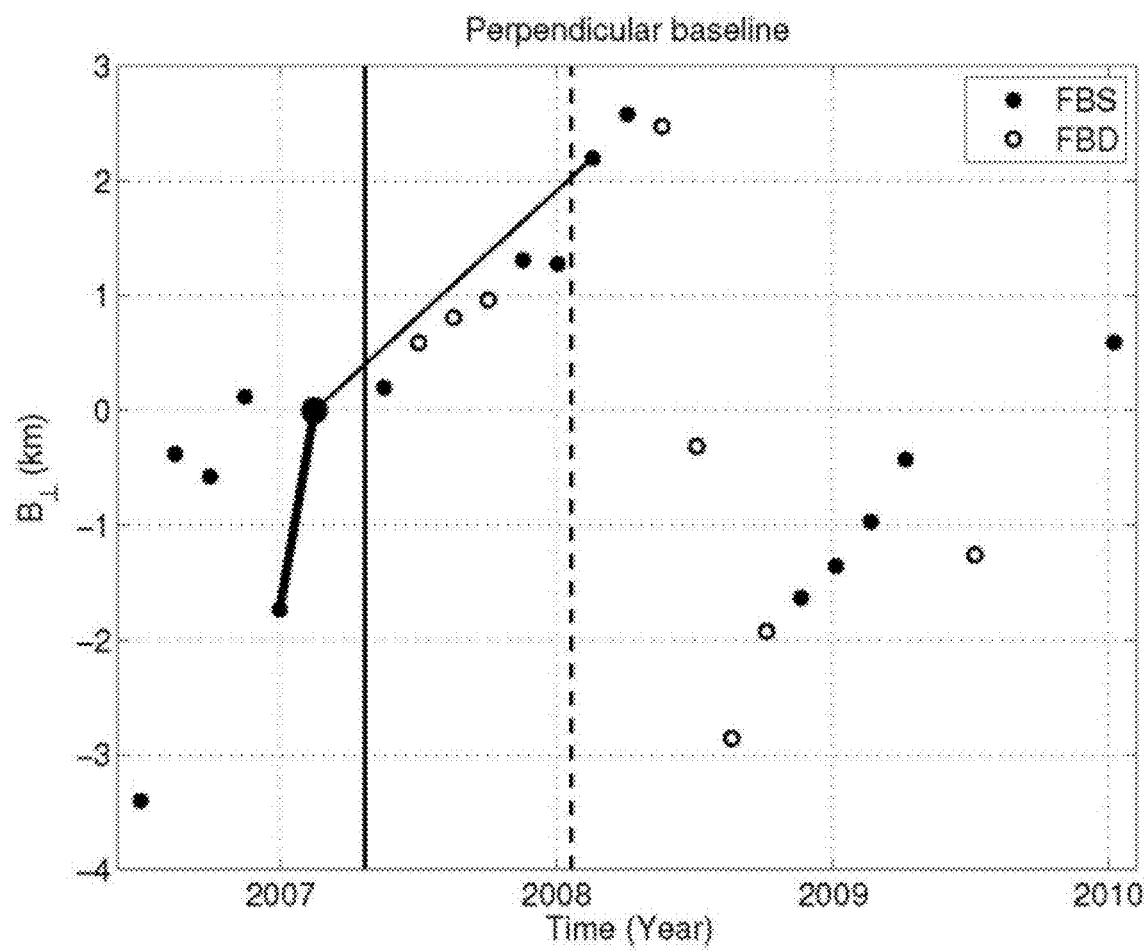
FIG. 2 illustrates the distribution of perpendicular baselines of the scenes used (vs. date) in accordance with one or more embodiments of the invention.

The InSAR data is processed taking four (4) looks in range and eight (8) looks in azimuth, with a resulting pixel size (in radar coordinates) of about 19 m in range and 28 m in azimuth. Geocoding is done based on a 1-arcsecond SRTM DEM (shuttle radar topography mission-digital elevation model), whose pixel size is about 26 m in EW and 30 m in NS. All interferometric pairs were made with a single master scene (FIG. 2) and every interferometric coherence difference was made with respect to a single master pair (FIG. 2). One example of a slave pair that spans the demolition period is drawn with a thin line in FIG. 2.

Note that the ALOS satellite orbit drifted until the perpendicular baseline reached about +2.6 km, and a major orbit maneuvering took place in the summer of 2008, resulting in a baseline of about −2.9 km. ALOS acquired dual polarization mode data (white dots) in summers. The range bandwidth in dual polarization mode (Fine Beam Dual: FBD) is 14 MHz, whereas the bandwidth of single polarization mode (Fine Beam Single: FBS) is 28 MHz. This difference in bandwidth means that the size of FBD's resolution element (resel) in range direction is twice that of FBS's, in other words, there are potentially twice as many decorrelation sources included in one resel. It may also be noted that the coherence due to the perpendicular baseline, $\gamma_{B_p}$, is smaller with FBD, as the critical baseline scales with the bandwidth. When FBD data are interpolated and interfered with FBS data, the extra image processing step affects the coherence (i.e. $\gamma_P$ changes).

Methodology

Maps of coherence indicate differences (or similarities) in the information of two SAR images. However, the decorrelation due to building demolition is often swamped by other surface property changes that vary from one data acquisition to another.

Figure 3:
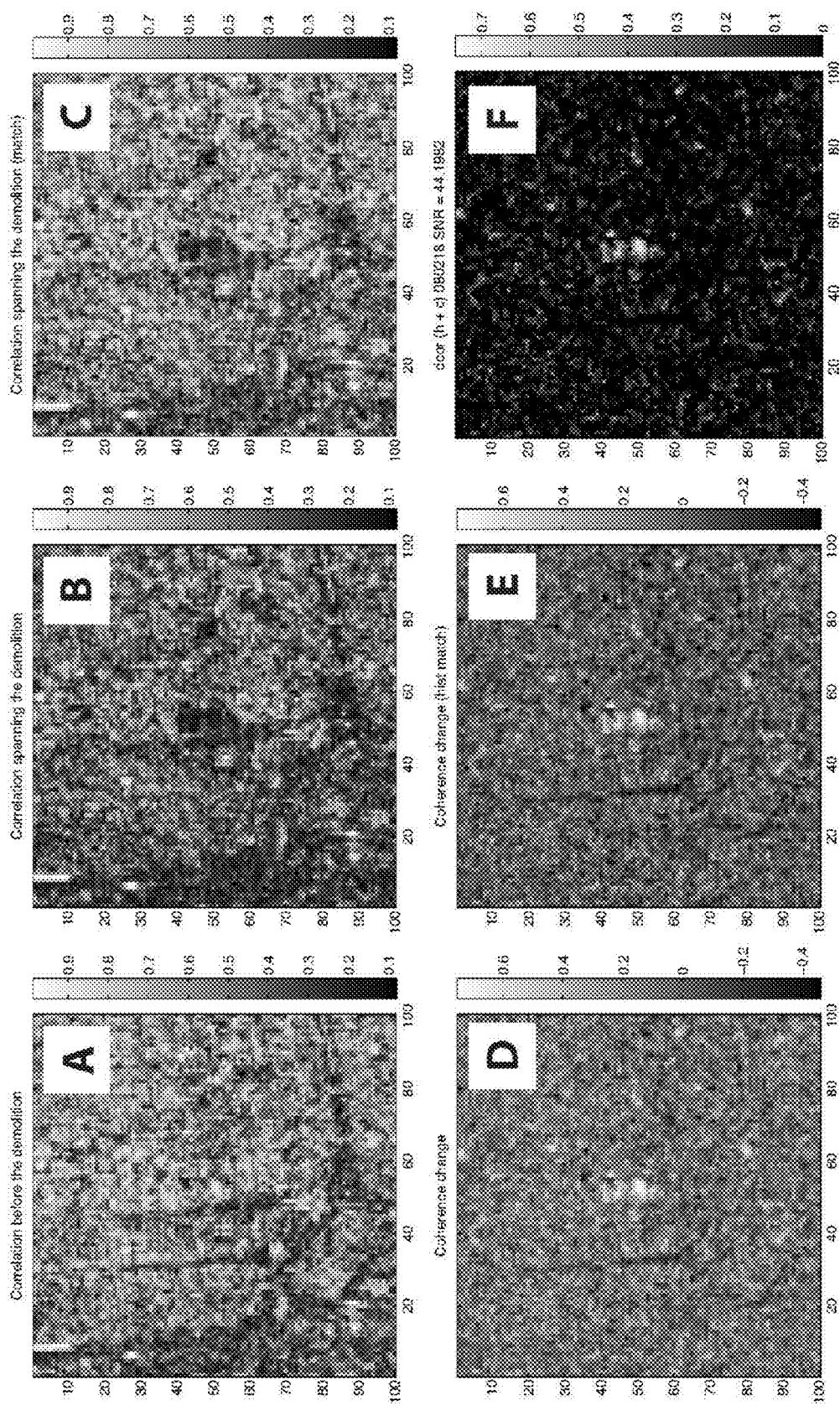
FIGS. 3A-3F illustrate coherence and coherence difference images in accordance with one or more embodiments of the invention.

FIGS. 3A-3F illustrate coherence and coherence difference images in accordance with one or more embodiments of the invention. More specifically, FIG. 3A illustrates the master coherence image (2006 Dec. 31-2007 Feb. 15) before the demolition began. FIG. 3B illustrates the slave coherence image (2007 Feb. 15-2008 Feb. 18) that spans the entire demolition period. FIG. 3C illustrates the slave coherence image after its histogram is matched to the master. FIG. 3D illustrates a coherence difference before histogram matching (i.e. (a)-(b)). FIG. 3E illustrates a coherence difference after histogram matching (i.e. (a)-(c)). FIG. 3F illustrates a coherence difference after causality constraint is applied.

Consequently, FIG. 3B shows the interferometric coherence map that spans the demolition period (the thin line segment in FIG. 2). Taking the difference of two coherence maps can help isolating the damage signals, as was shown in the study of Fielding et al. [15] for the 2003 Bam earthquake in Iran. The simple differencing works well when the spatial and temporal baselines of the two interferometric pairs are almost the same. However, there is no guarantee of finding a pre-seismic interferometric pair, whose baseline is similar to those of a coseismic pair. This limitation may be mitigated by applying a histogram matching methodology described below.

The pixel values in the coherence difference map can be expressed as follows.

$$\Delta\gamma = \gamma^0 - \gamma^1 \gamma_D^1 \quad (3)$$
$$= (1 - \gamma_D^1)\gamma^0 + (\gamma^0 - \gamma^1)\gamma_D^1 \quad (4)$$

where the superscript 0 represents the time span of the master pair before damage and the superscript 1 is for the slave pair spanning the damage. We define $1-\gamma_D^1$ as the decorrelation due to building damage. Note that $\Delta\gamma$ contains the damage-induced decorrelation scaled by the original coherence (the first term) and the background coherence difference scaled by the damage-induced coherence (second term). Since $\Delta\gamma=\gamma^0-\gamma^1$ for undamaged areas ($\gamma_D^1=1$), the background coherence difference should be minimized in order to maximize the isolation of the damage-induced decorrelation.

Figure 4:
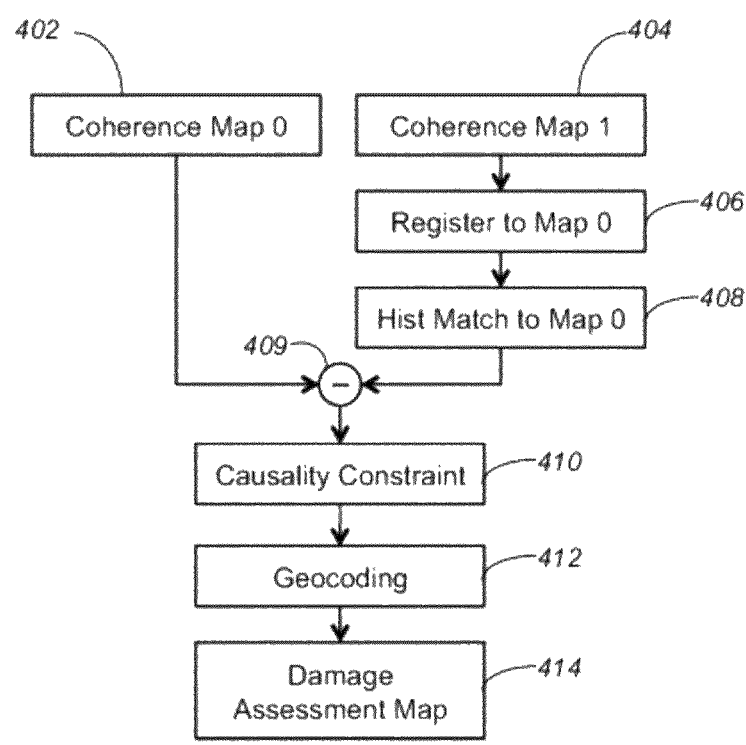
FIG. 4 shows the workflow to produce DPMs in accordance with one or more embodiments of the invention.

FIG. 4 shows the workflow to produce DPMs in accordance with one or more embodiments of the invention. "Coherence Map 0" 402 is a master coherence image and "Coherence Map 1" 404 is a slave coherence image, both in radar coordinate system. Accordingly, at a first step, the master coherence map 402 and slave coherence map 404 for areas before/subsequent to (i.e., including) a damage event are obtained (e.g., from an InSAR without ground truth validation). At 406, the slave 404 is registered to the master 402 (e.g., using cross-correlation of amplitude images). Because coherence values change from pixel to pixel at short wavelength scale, especially at all boundaries of different type of scatterers, coherence differencing can produce significant high-frequency noise if image coregistration is not sufficiently accurate. When a single master is used, three SAR images, or single-look complexes (SLCs) are required to produce one coherence difference image, where two slave SLCs are registered to a common master SLC. All three SLCs are processed with the master scene's doppler centroid to minimize the need for sub-pixel level resampling of the slave coherence image. All interferometric coherence images may be generated using ROI PAC, the InSAR software package developed by JPL/Caltech [24].

At 408, pixel values of the slave coherence map are modified using histogram matching. The histogram matching results in the slave coherence map exactly matching the master coherence map (i.e., such that they are statistically identical). Details regarding the histogram matching are discussed in further detail below.

At 409 a coherence difference between the slave and master coherence maps are computed to produce a damage proxy map. At 410, background clutter is suppressed by applying a causality constraint to the damage proxy map (see below for further details). The damage proxy map may then be transformed into a goereference coordinate system at 412 and overlayed onto a map/geographic information program (e.g., Google Earth™) based on the georeference coordinate system (to produce the final damage assessment map 414).

HistogramMatching

At step 408, histogram matching is performed that matches the slave coherence map 1 404 to the master coherence map 0 402. The coherence pixel values can be considered as a set of multiple realizations of a random variable X that follows a probability density function (PDF) of $p_X(x)$, which is the normalized histogram of the coherence pixel values. One can then consider the following cumulative distribution function (CDF):

$$F_x(x) = P\{X \le x\} = \int_{-\infty}^{x} p_x(r)dr \quad (5)$$

In general a CDF has the following properties:

For a continuous random variable X, $Y=F_X(X)$ is another continuous random variable that has a uniform distribution in [0, 1]. In this regard, let a random variable X follow a cdf F(x), where F (x) is continuous and increasing, and define $Y=F(X)$. To find the cdf of Y:

$$FY(y) = P\{Y \le y\}$$
$$= P\{F(X) \le y\}$$
$$= P\{X \le F^{-1}(y)\}$$
$$= F(F^{-1}(y)) = y, 0 \le y \le 1$$

Thus, the random variable Y has a uniform distribution in [0,1], since, $$p_Y(y) = \frac{dF_Y(y)}{dy} = 1, \text{ for } 0 \leq y \leq 1$$

If a random variable Y has a uniform distribution in [0, 1], then $Z=F_z^{-1}(Y)$ has a pdf of $p_z(z)$.

These properties lead to that $Z=F_z^{-1}(F_x(X))$ follows $p_Z(z)$. In other words, $F_z^{-1}(F_x)$ is a function that maps the given random variable X into the desired random variable Z. Thus, if one chooses X as the slave coherence 404 and Z as the master coherence 402, the function maps the histogram of the slave coherence image 404 to that of the master coherence image 402. The inverse CDF of Z is not guaranteed to exist, especially when the number of pixels of an image is larger than the number of pixel value levels. In most cases, this problem can be solved with strict ordering of pixel values [25], where sorting is implemented not only based on the individual pixel values, but also the values of neighboring pixels.

Figure 5:
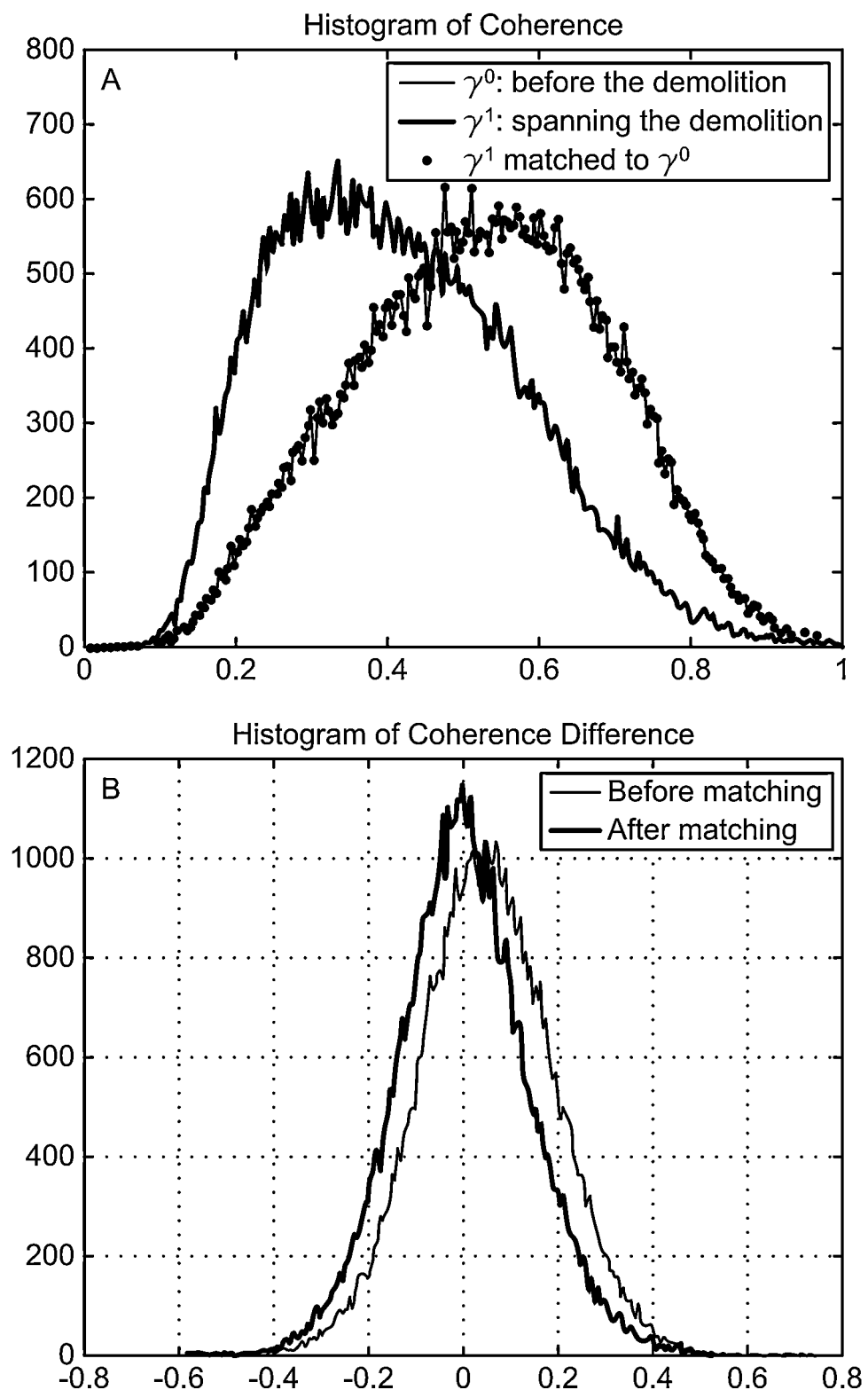
FIGS. 5A and 5B illustrate the effect of histogram matching in accordance with one or more embodiments of the invention.

The effect of the histogram matching at 408 is demonstrated in FIGS. 5A and 5B. In this regard, FIG. 5A illustrates that as perpendicular and temporal baselines get larger, the statistics of coherence pixel values change, having a larger population of lower coherence (thick curve) compared to the original (thin line). Histogram matching 408 guarantees recovery of the original statistics. FIG. 5B illustrates that histogram matching 408 also ensures an unbiased coherence difference (thick curve), which enables a causality constraint, multi-looking, and time series analysis of the coherence change.

More specifically, the thin curve in FIG. 5A is the coherence histogram of the master pair 402 (i.e. before the demolition) and the thick curve is for the slave pair 404 (spanning the demolition). Since the slave pair 404 has a larger temporal baseline and a slightly larger perpendicular baseline than the master pair 402, as shown in FIG. 2, the shape of the slave pair histogram is significantly different from that of the master pair, skewing toward left. The histogram matching methodology 408 of embodiments of the invention adjusts pixel values of the slave coherence map 404, so that it precisely matches the histogram of the master pair 402 (the dots in FIG. 5A). Thus, the two coherence images become statistically identical.

There are a few advantages of histogram matching 408. If one takes the difference of the coherence maps without matching the histogram, the results are prone to a bias (the thin curve in FIG. 5B). Removing the bias with histogram matching 408 enables unbiased time series analysis of coherence change, and it also makes it possible to take multiple looks at coherence difference maps to further suppress noise. In addition, the unbiased difference enables us the application of a causality constraint described below.

Causality Constraint 410

Coherence difference values can range from −1 to 1. For the purpose of damage detection, it is not very interesting to highlight areas of negative decorrelation where coherence becomes higher in the slave pair 404 than in the master pair 402, because damage in general does not improve coherence. Significant surface change, such as building demolition/construction and temporary structure change, during the time span of the master pair 402 could appear as negative decorrelation. Since these pre-event changes are not the appropriate targets, they are removed by applying a causality constraint 410, or negativity masking All negative pixel values in the coherence difference map are clipped to zero.

FIGS. 3A-3F show the result of each step. The coherence image spanning the demolition (FIG. 3B and FIG. 3C) has extra decorrelation in the middle of the image, compared to the master coherence (of FIG. 3A). The result of histogram matching 408 is shown in FIG. 3C, which is statistically identical to FIG. 3A, whereas FIG. 3B has significantly more blue pixels (illustrated as darker shaded pixels) than FIG. 3A does. In simple coherence difference (FIG. 3D), the demolition site stands out against the background, but there is a high level of background noise including a number of false alarms. The background noise is reduced by the histogram matching 408 (FIG. 3E) and the causality constraint 410 (FIG. 3F). Since the location of the demolition site is known, it is also known where the signal should appear and thus the SNR can be calculated. The SNR of the damage may be defined as the ratio of the intensity of coherence difference at the demolition site pixels to that of the entire image. The damage SNR at the demolition site is measured as 17.3 with simple difference (FIG. 3D). The SNR increased to 23.1 after histogram matching 408 (FIG. 3E) and to 44.6 with causality constraint 410 (FIG. 3F).

Coherence Change Time Series

Figure 6:
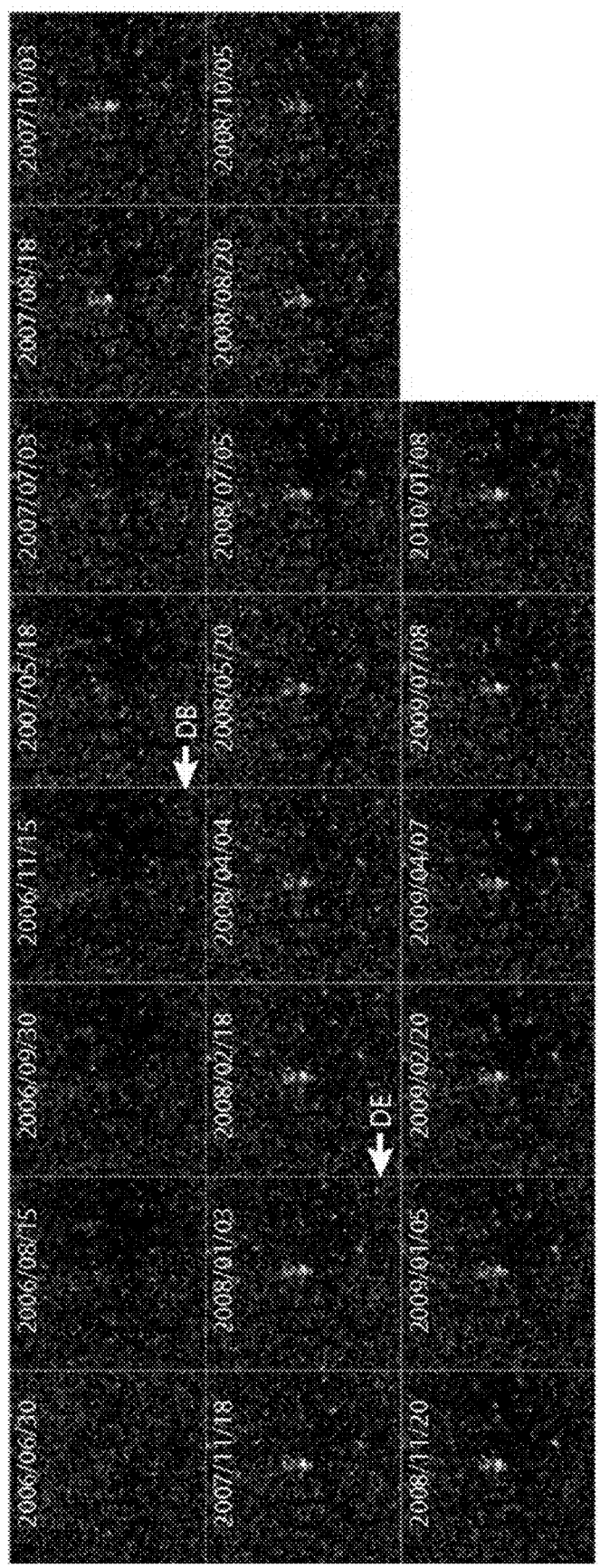
FIG. 6 illustrates cumulative coherence change time series in accordance with one or more embodiments of the invention.

As the bias in the coherence difference map is removed using histogram matching 408, a time series analysis of the coherence difference can be implemented. 23 interferograms can be formed using 24 ALOS PALSAR scenes, with a single master of 2007 Feb. 15 scene (the big dot in FIG. 2). With the master pair 402 of 2006 Dec. 31-2007 Feb. 15, twenty two (22) coherence difference maps are formed, all with histogram matching 408 and causality constraint 410. This cumulative coherence change time series is shown in FIG. 6. The timings of the beginning (2007 Apr. 23) and ending (2008 Jan. 22) of the demolition project are indicated with the thick vertical lines and the letters "DB" and "DE" respectively.

After the demolition project begins, in FIG. 6, a red blob (depicted as a darker grey blob) in the middle of the image grows with time with a big increase between 2008 Jul. 3 and 2007 Aug. 18. Even after the demolition project is over and as new buildings are being constructed in the area, the scattering property remains different from before the demolition began, so the strength of the red/darker blob does not change with statistical significance. The pairing does not have to be made with a single master. If the master and slave pairs are selected successively with small temporal baselines, one can highlight the change occurred only during the small time steps. For example, it is possible to separate the construction signal from the demolition signal by having another master after the demolition project is over. However, all these applications require that master pair maintain relatively high coherence (nothing much happened during master pair).

Figure 7:
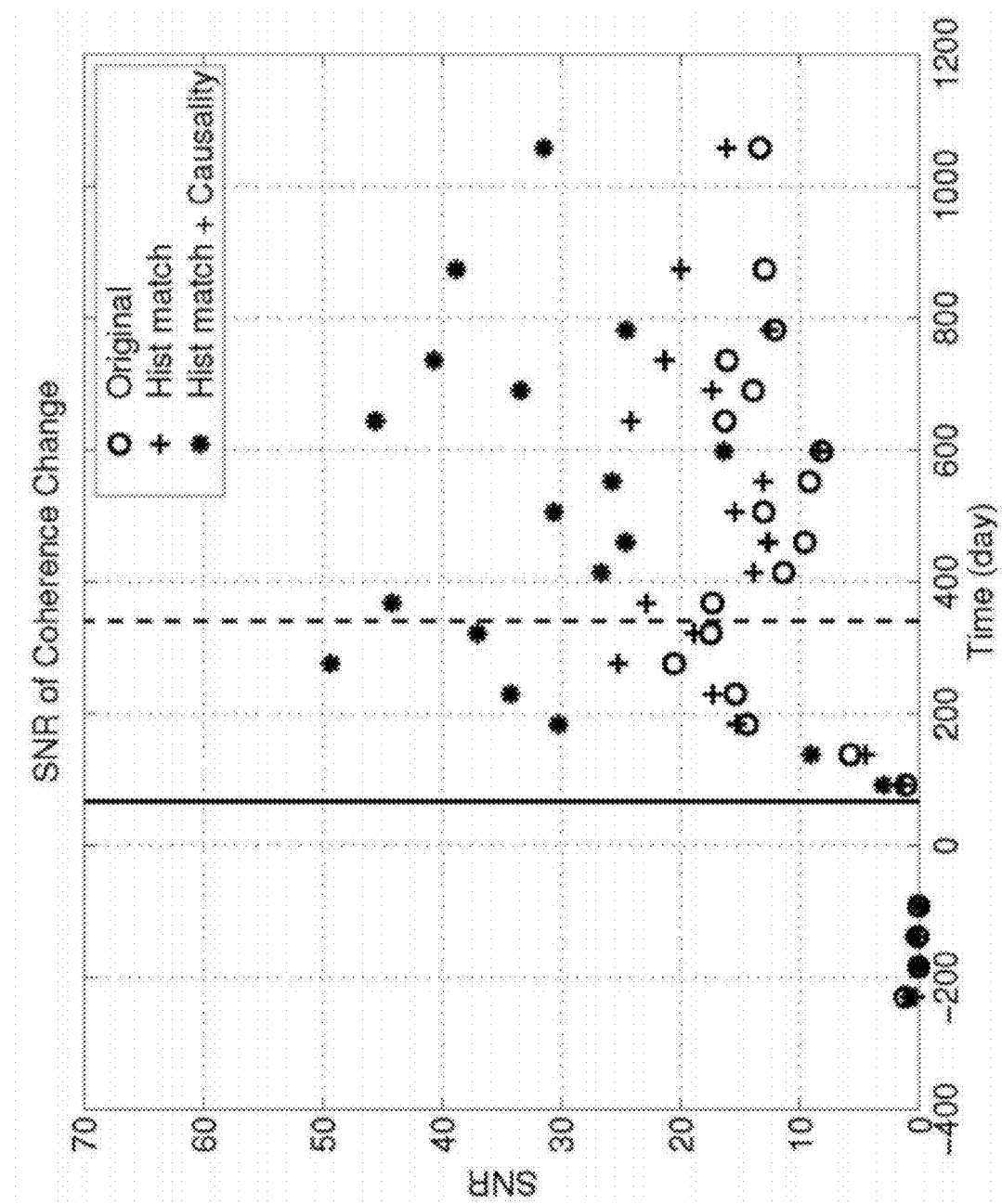
FIG. 7 shows the time series/variation of the signal to noise ratio (SNR) of the demolition site in accordance with one or more embodiments of the invention.

FIG. 7 shows the time series/variation of the SNR of the demolition site. The white circles are simple coherence difference. The plus symbols are after histogram matching 408. The black circles are after histogram matching 408 and causality constraint 410. The signal starts showing up immediately after the beginning of the demolition (solid vertical line) and reaches the strongest level around the end of the demolition (dashed vertical line). Histogram matching 408 improved the SNR in all pairs except one, a little after the beginning of the demolition. Accordingly, the plot clearly shows the growing anomaly after the beginning of the demolition project (the solid vertical line), and it reaches the maximum toward the end of the project. Then it maintains a similar level. During the nine month of the demolition project, the SNR increases by a factor of 100, from 0.32 to about 32 on average. The average SNR increase due to the histogram matching is 30%, and the causality constraint brings additional 120%.

The usability of SAR amplitude variation due to building damage can also be explored. It may be observed that the RMS (root mean squared) intensity ratio of the demolition area to the background decreased by a factor of 4.6 during the demolition. The intensity decrease may be due to the loss of corner reflection at the sides of the buildings toward the satellite. In this particular case, the sensitivity of SAR amplitude variation to the building demolition was about 22 times smaller than that of the coherence difference.

Referring again to FIG. 4, the master coherence map 402 and slave coherence map 404 (i.e., the more recent coherence map that would contain/include damaged areas) are obtained. The slave map 404 is registered to the master map 402 at 406. The coherence difference between the two maps 402 and 404 is computed at 409. In addition, histogram matching 408 may be performed on the slave map 404. Once the coherence difference 409 is performed, pre-event changes may be removed by applying a causality constraint at 410. To remove false data associated with traffic conditions, roads may be mapped out using geocoding 412 (or reverse geocoding to identify the road locations). In addition, the geocoding 412 is used to remove the amount of information transferred/stored in a damage assessment map 414. In other words, geocoding 412 may be used to convert a raster image into coordinates or addresses. The result is the damage assessment map 414 that may be color coded and depicts blobs or other visual/audio-visual indicators of damage. Such a map 414 may be overlaid onto a geographic/satellite image (e.g., a Google Earth™ image) to provide a visual indicator of the location of the damage. The damage map 414 (including any GIS or satellite image) may also be stored/saved to a database.

Other Demotion and Construction Sites

Other demolition or construction projects may be detected near the test site. FIG. 8A shows the DPM of larger area that includes downtown Pasadena, Calif. The color scale of the coherence difference image (FIG. 3) was adjusted to increase the color contrast, and the image was overlaid on a Google Earth™ image. Most of the clear red blobs (displayed as darker pixels) coincide with real demolition or construction projects. The DPM was created from a coherence difference pair with coherence images spanning 2006 Dec. 31-2007 Feb. 15 and 2007 Feb. 15-2008 Feb. 18.

FIG. 8B illustrates a Google Earth™ image. Red/darker pixels in FIG. 8A were compared with optical images acquired on 2007 Oct. 23 and 2008 Jan. 9. White ellipses and circles 802 in FIG. 8B indicate correctly detected signals that are confirmed with optical images acquired on 2007 Oct. 23 and 2008 Jan. 9, available from Google Earth™. Circles 804 are false alarms, and black ellipses 806A and 806B are undetected events.

Figure 8:
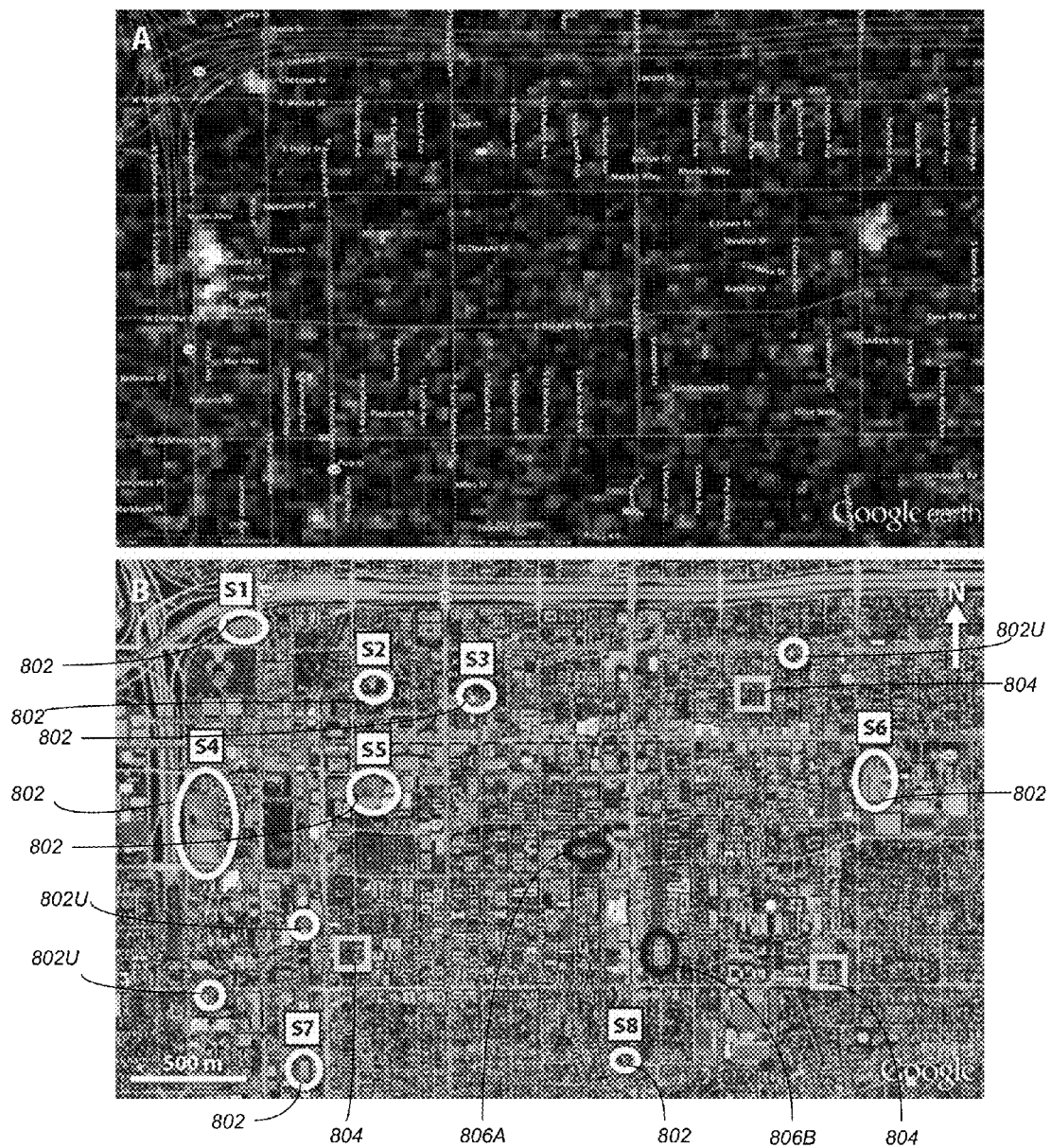
FIG. 8A shows the DPM of larger area that includes downtown Pasadena, Calif. in accordance with one or more embodiments of the invention.
FIG. 8B illustrates a Google Earth™ image in accordance with one or more embodiments of the invention.
Figure 9A:
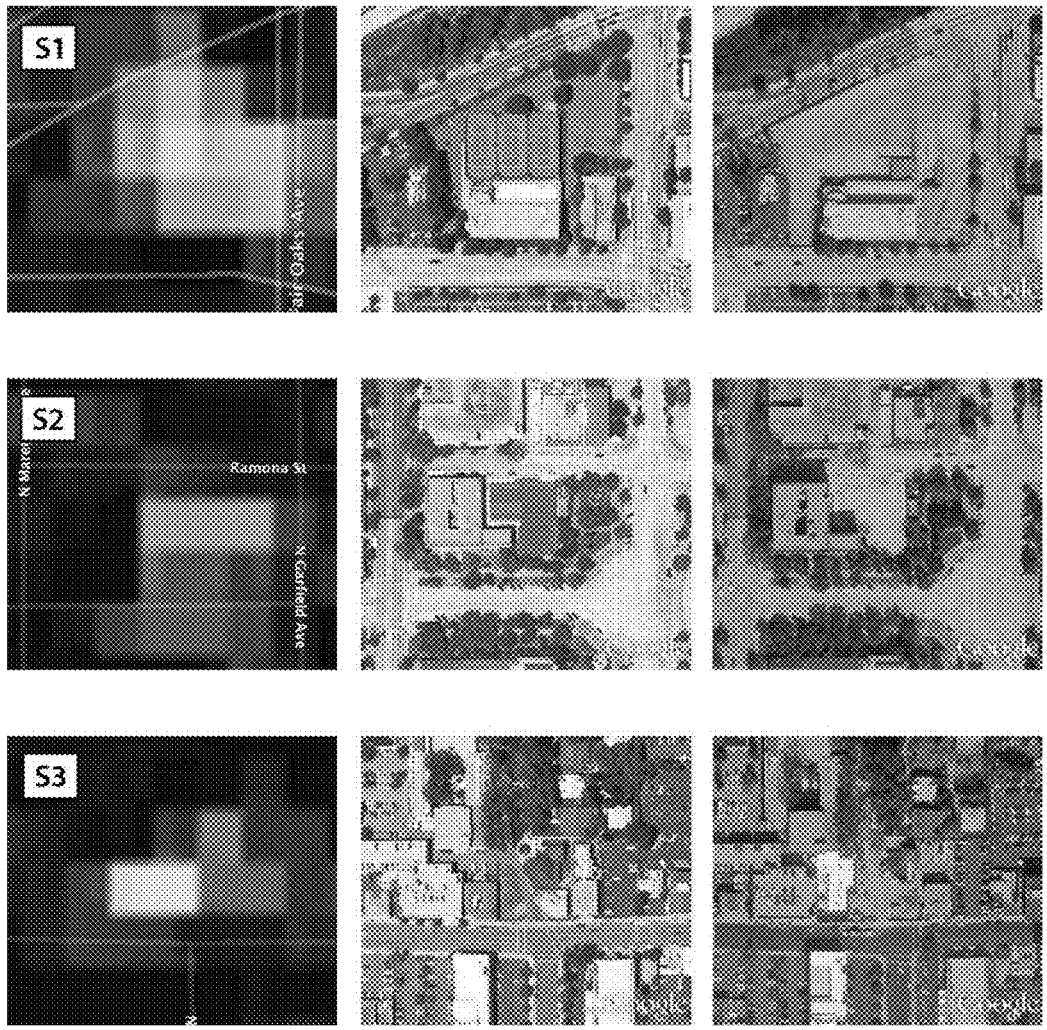
FIGS. 9A-9C illustrate blowups of the sites in FIG. 8A in accordance with one or more embodiments of the invention.
Figure 9B:
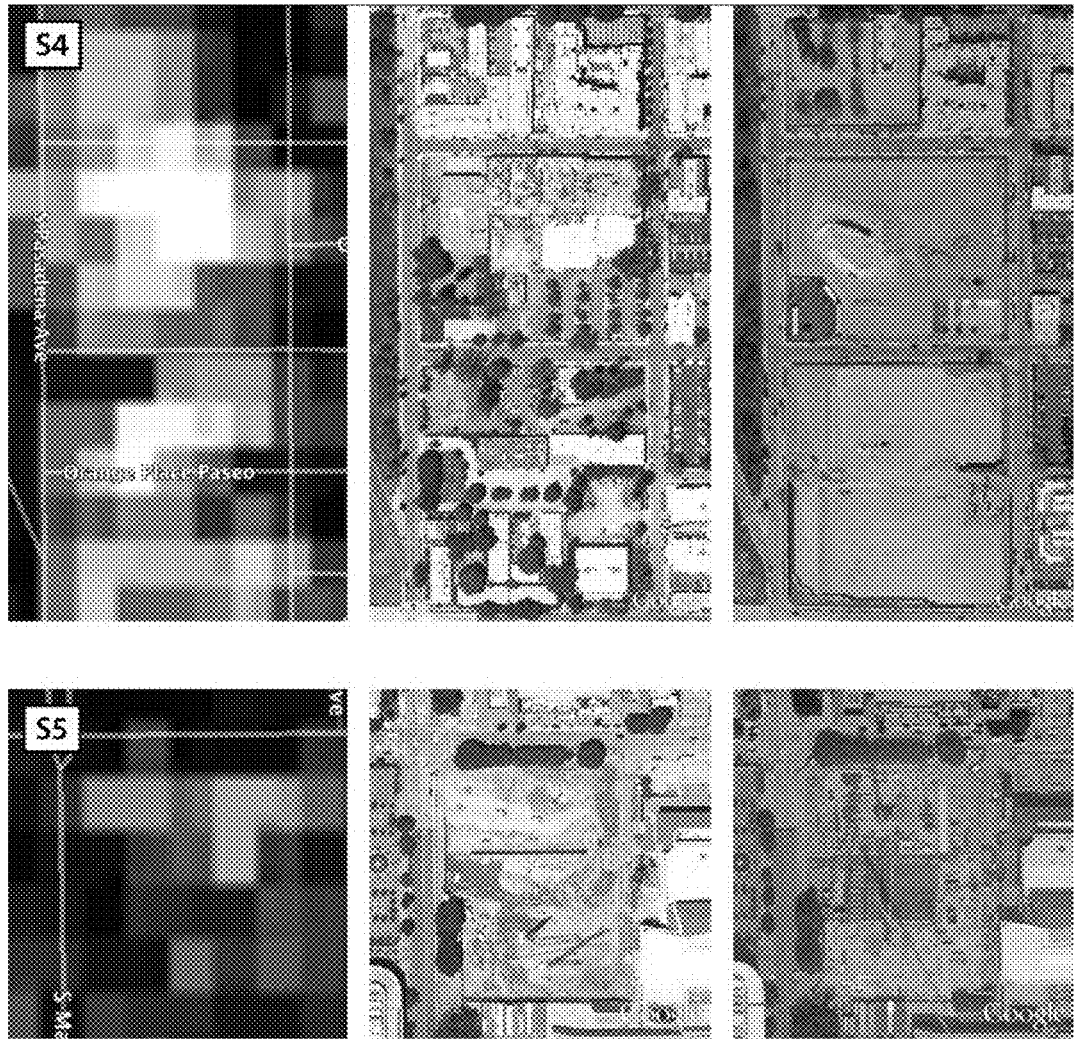
Figure 9C:
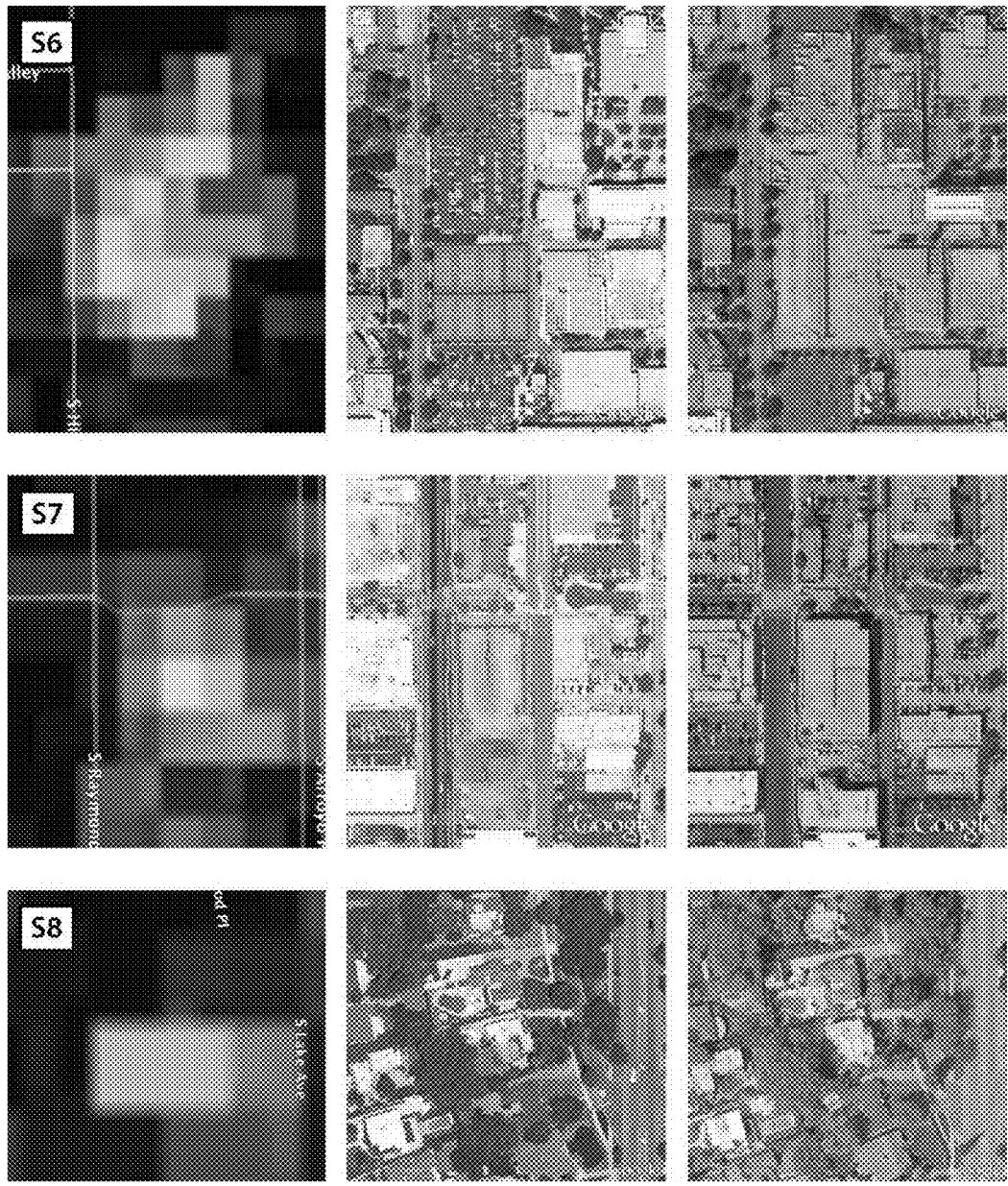

Each of the numbered project sites S1-S8 is shown in detail in FIGS. 9A-9C. Note that all of these demolition/construction sites are detected in FIG. 8A, indicating significant surface changes occurred between 2007 Oct. 23-2008 Jan. 9 (optical) and 2007 Feb. 15-2008 Feb. 18 (radar slave pair). Accordingly, eleven (11) demolition and construction projects out of the fourteen (14) strongest signals were confirmed. Other circles and ellipses are discussed below.

FIG. 9A illustrates a blowup of FIG. 8A at sites 1, 2, and 3. Site 1 shows that there used to be tennis courts in October 2007, but everything was removed in January 2008. At site 2, a number of rectangular black materials were removed. At site 3, a couple of small buildings were demolished on the right, and on the left, a new white flat-top building replaced an old brown shingled house.

FIG. 9B illustrates a blowup of FIG. 8A at sites 4 and 5. Site 4 is the original target area shown in FIG. 1, where old buildings were all demolished for a new apartment complex. Site 5 shows a new foundation constructed that must have changed the radar scattering property. The new building was constructed from Winter 2006 to Summer 2008 as part of the Pasadena Convention Center expansion project.

FIG. 9C illustrates a blowup of FIG. 8A at sites 6, 7, and 8. Site 6 shows extensive remodeling of Pasadena City College, where they removed the parking lot, tennis courts, and a building. Site 7 shows two buildings constructed between 2007 Oct. 23 and 2008 Jan. 9. Site 8 shows an individual house that underwent a room extension.

Referring again to FIG. 8, there are red blobs/darker pixels in FIG. 8A that are not highlighted in the blowups of FIGS. 9A-9C. Such blobs are dimmer than those highlighted, and they turned out to be either correct detections or false alarms. The unnumbered white circles 802U are due to 1) a dirt ground that was paved, 2) minor landscape work, and 3) a few trees cut+building top painted, respectively from left to right. Circles 804 represent potential false alarms. No obvious changes were confirmed from visual inspection of the optical images, although a more detailed analysis may indicate the source of the signal. In order to cover the demolition period, the slave pair with a temporal baseline of 368 days was selected. For a disaster response, a shortest possible time span can be used for a slave pair, as a false alarm rate should decrease as the time span of coherence shrinks There may also be "missed signals". The two black ellipses 806A and 806B in FIG. 8B show the locations of noticeable large blobs of pink and/or white pixels, but the signal strength was not strong enough to be red (or dark pixels depending on the contrast and color settings). However, those pixels turned out to be real ground surface change. The ellipse 806A in the middle of FIG. 8B was due to a single family house replaced with a couple of small 2- and 4-story buildings. The lot is narrow and long in E-W direction (15 m×100 m) and immediately surrounded by 3-story buildings. This geometry may have caused reduced visibility in the radar line of sight (approximately east at about 38 degrees from the vertical). The second black ellipse 806B towards the southeast also shows up in the DPM as a diffuse pink and white blob. This change is due to dirt ground that was covered with a building foundation, similar to what happened at site 5 but a little smaller in area.

The probability of detection and the probability of false alarm are not readily available unless there is prior knowledge of which ones are signal+noise and which ones are noise only, or there is a functional form of the likelihood of each case. In one or more embodiments, a list of addresses that underwent building demolition and construction projects during the time spans of interest may be collected/retrieved from the appropriate government agency.

The range of color that may be displayed to a user can be determined empirically by visual inspection of the area with optical images provided by Google Earth™. The timings of optical imagery and radar data acquisition may not exactly match. Thus, there may not be a one-to-one correspondence in what is shown in the optical images and in the DPM. Moreover, the difference in optical imagery shows changes in a single time span, whereas the difference in coherence shows relative changes in two time spans. Even though there was change observed in optical images, it is possible that the DPM methodology did not detect it, if there were similar amounts of decorrelation in the master pair as in the slave pair.

Change in much smaller scatterers may also be detected in the DPM. Site 8 (S8) shows a room addition project of a single family house. The size of the added room was only about 4 m×7 m, much smaller than the 4-range-look pixel size. However, the change appears in the DPM as a bright red/darker shaded blob. This high sensitivity was possible potentially because the house happened to align parallel to the along track direction of ALOS ascending orbit (i.e. perpendicular to the line-of-sight direction), making the house a dominant scatterer in a pixel. If that was the case, an optimal flight path of airborne measurements such as UAVSAR [26] for DPM should be parallel to building sides, dominantly north-south and east-west in Pasadena, for example.

Differences in the traffic condition may be a source of false alarms. Cars backed up in the street affect the coherence. For example if there was a traffic jam only in the last scene (i.e. the slave scene of the slave pair), it can show up as red/darker shaded blobs in the DPM. ALOS acquired PALSAR data from ascending orbit at around 10:21 PM (local time) in Pasadena, and the traffic conditions may have not varied much from one scene to another. However, if the last scene was acquired on a weekend and the others on weekdays or vice versa, there could be false alarms associated with the weekly variation in traffic condition. 2006 Dec. 31, 2007 Feb. 15, and 2008 Feb. 18 were Sunday, Thursday, and Monday, respectively.

Returning to FIG. 4, using a Geographical Information System (GIS), it is possible to mitigate the effect of traffic condition difference by masking out the roads. A GIS could also be used to convert the latitude and longitude coordinates into a list of addresses, a process known as reverse geocoding 412. Reverse geocoding 412 may be tested with "geopy" python script and Google's free geocoding engine to confirm that the converted address information matches the city records. Converting the raster image into coordinates or addresses dramatically reduces the size of information to be transferred. This can be useful during an emergency when communication bandwidth is often limited.

Figure 10:
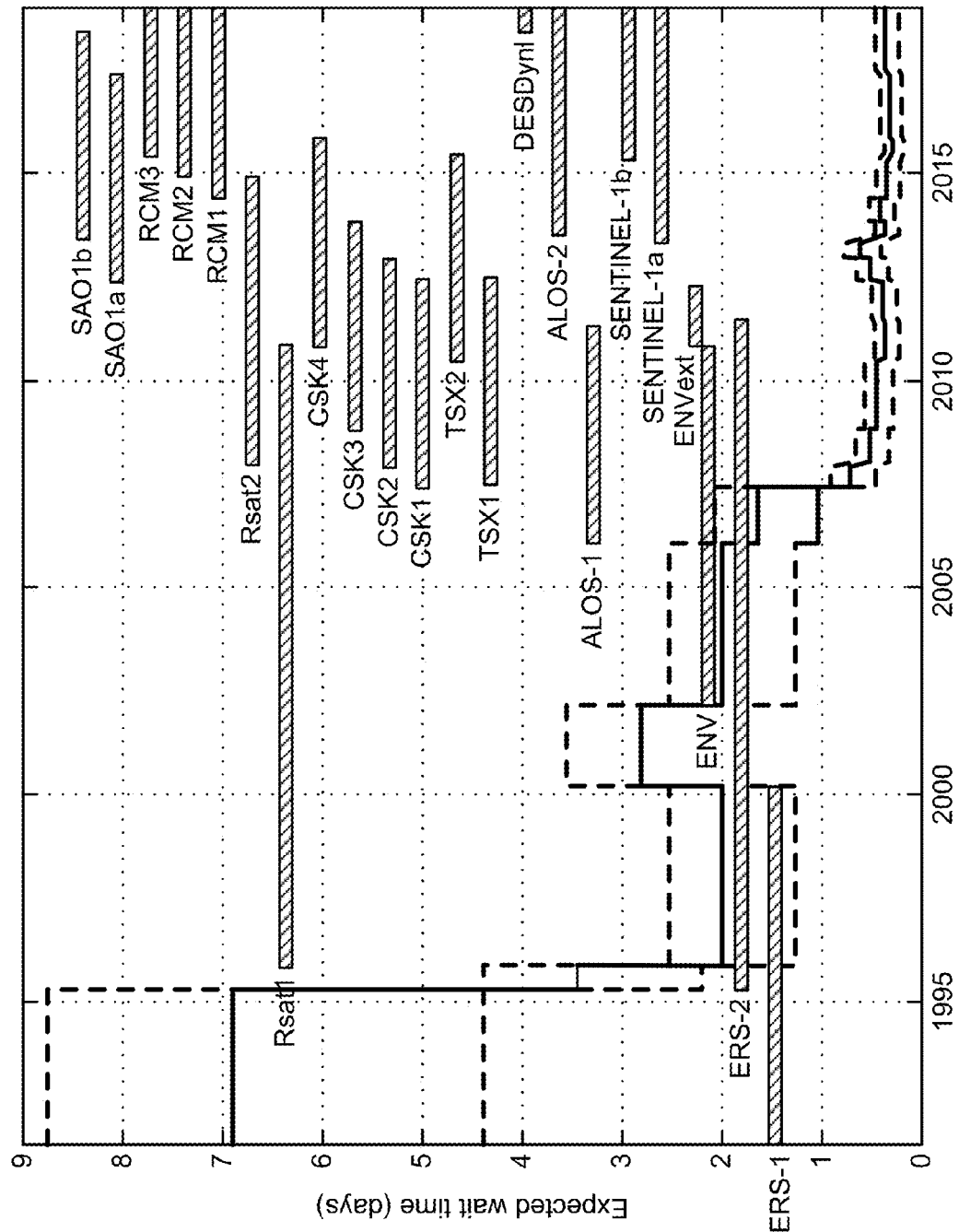
FIG. 10 shows past, present, and future radar missions (gray bars) and expected wait time (black curves) until the first radar satellite visits a disaster site in accordance with one or more embodiments of the invention.

One of the most important factors that determines the usefulness of this methodology is data latency. Guidance to rescue operations may not be very useful if it does not become available within a few days after a major earthquake. The processing time of InSAR and DPM was about 90 minutes at a Linux machine with Intel Xeon CPU 2.67 GHz. The expected wait time in May 2012 for radar satellites to visit a damage site after an earthquake is about 10 hours at a latitude of 38°. FIG. 10 shows past, present, and future radar missions (gray bars) and expected wait time (black curves) until the first radar satellite visits a disaster site. Future InSAR missions may continue to keep the data acquisition latency within a day. If one ignores the latency of data transfer and orbit file generation, it is possible that DPMs could become available within a day after an earthquake.

The building demolition at the test site is devastation or destruction rather than partial damage. To test embodiments of the invention, only this high degree of damage was investigated rather than trying to distinguish different levels of damage. Recent studies demonstrated the potential and challenge of using high-resolution (15-50 cm) optical imagery to assess different levels of damage [27] [28]. Radar images have lower resolution. However, phase variance (i.e. coherence) analysis with coherent radar signal (monochromatic compared to sunlight) is highly sensitive to surface property change compared to intensity variation analysis as with optical imagery. In coherence analysis, the carrier frequency may be more important than resolution, as it determines the size of objects the radar signal scatters most with. Embodiments of the invention may also be used with C-band and X-band data while assessing their sensitivity to different levels of building damage.

Hardware Environment

Figure 11:
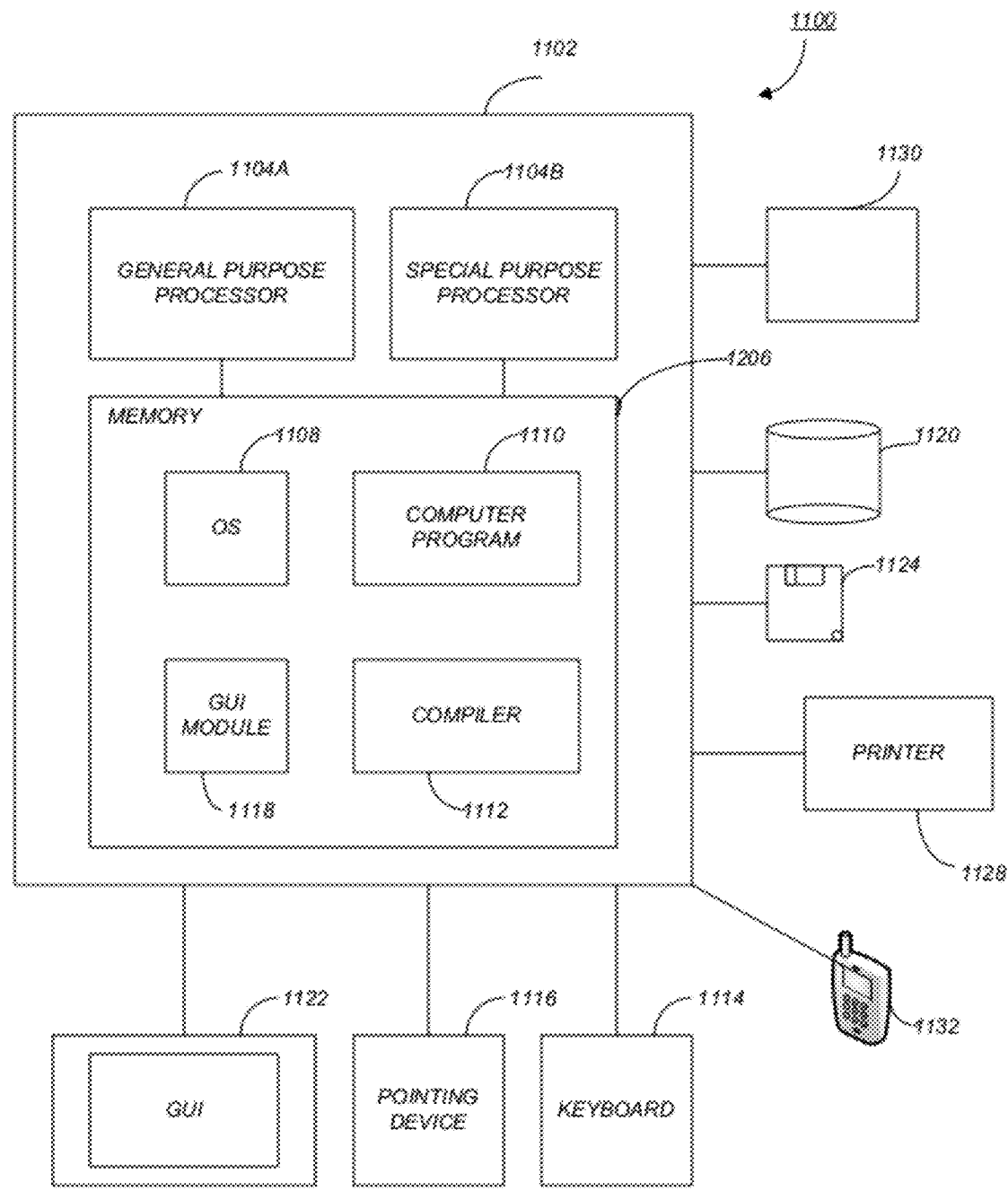
FIG. 11 is an exemplary hardware and software environment used to implement one or more embodiments of the invention.

FIG. 11 is an exemplary hardware and software environment 1100 used to implement one or more embodiments of the invention. The hardware and software environment includes a computer 1102 and may include peripherals. Computer 1102 may be a user/client computer, server computer, or may be a database computer. The computer 1102 comprises a general purpose hardware processor 1104A and/or a special purpose hardware processor 1104B (hereinafter alternatively collectively referred to as processor 1104) and a memory 1106, such as random access memory (RAM). The computer 1102 may be coupled to, and/or integrated with, other devices, including input/output (I/O) devices such as a keyboard 1114, a cursor control device 1116 (e.g., a mouse, a pointing device, pen and tablet, touch screen, multi-touch device, etc.) and a printer 1128. In one or more embodiments, computer 1102 may be coupled to, or may comprise, a portable or media viewing/listening device 1132 (e.g., an MP3 player, iPod™, Nook™, portable digital video player, cellular device, personal digital assistant, etc.). In yet another embodiment, the computer 1102 may comprise a multi-touch device, mobile phone, gaming system, internet enabled television, television set top box, or other internet enabled device executing on various platforms and operating systems.

In one embodiment, the computer 1102 operates by the general purpose processor 1104A performing instructions defined by the computer program 1110 under control of an operating system 1108. The computer program 1110 and/or the operating system 1108 may be stored in the memory 1106 and may interface with the user and/or other devices to accept input and commands and, based on such input and commands and the instructions defined by the computer program 1110 and operating system 1108, to provide output and results.

Output/results may be presented on the display 1122 or provided to another device for presentation or further processing or action. In one embodiment, the display 1122 comprises a liquid crystal display (LCD) having a plurality of separately addressable liquid crystals. Alternatively, the display 1122 may comprise a light emitting diode (LED) display having clusters of red, green and blue diodes driven together to form full-color pixels. Each liquid crystal or pixel of the display 1122 changes to an opaque or translucent state to form a part of the image on the display in response to the data or information generated by the processor 1104 from the application of the instructions of the computer program 1110 and/or operating system 1108 to the input and commands. The image may be provided through a graphical user interface (GUI) module 1118. Although the GUI module 1118 is depicted as a separate module, the instructions performing the GUI functions can be resident or distributed in the operating system 1108, the computer program 1110, or implemented with special purpose memory and processors.

In one or more embodiments, the display 1122 is integrated with/into the computer 1102 and comprises a multi-touch device having a touch sensing surface (e.g., track pod or touch screen) with the ability to recognize the presence of two or more points of contact with the surface. Examples of multi-touch devices include mobile devices (e.g., iPhone™, Nexus S™, Droid™ devices, etc.), tablet computers (e.g., iPad™, HP Touchpad™), portable/handheld game/music/video player/console devices (e.g., iPod Touch™, MP3 players, Nintendo 3DS™, PlayStation Portable™, etc.), touch tables, and walls (e.g., where an image is projected through acrylic and/or glass, and the image is then backlit with LEDs).

Some or all of the operations performed by the computer 1102 according to the computer program 1110 instructions may be implemented in a special purpose processor 1104B. In this embodiment, the some or all of the computer program 1110 instructions may be implemented via firmware instructions stored in a read only memory (ROM), a programmable read only memory (PROM) or flash memory within the special purpose processor 1104B or in memory 1106. The special purpose processor 1104B may also be hardwired through circuit design to perform some or all of the operations to implement the present invention. Further, the special purpose processor 1104B may be a hybrid processor, which includes dedicated circuitry for performing a subset of functions, and other circuits for performing more general functions such as responding to computer program 1110 instructions. In one embodiment, the special purpose processor 1104B is an application specific integrated circuit (ASIC).

The computer 1102 may also implement a compiler 1112 that allows an application or computer program 1110 written in a programming language such as COBOL, Pascal, C++, FORTRAN, or other language to be translated into processor 1104 readable code. Alternatively, the compiler 1112 may be an interpreter that executes instructions/source code directly, translates source code into an intermediate representation that is executed, or that executes stored precompiled code. Such source code may be written in a variety of programming languages such as Java™, Perl™, Basic™, etc. After completion, the application or computer program 1110 accesses and manipulates data accepted from I/O devices and stored in the memory 1106 of the computer 1102 using the relationships and logic that were generated using the compiler 1112.

The computer 1102 also optionally comprises an external communication device such as a modem, satellite link, Ethernet card, or other device for accepting input from, and providing output to, other computers 1102. Such input may include radar satellite based data, seismometer based data, GPS based data, etc.

In one embodiment, instructions implementing the operating system 1108, the computer program 1110, and the compiler 1112 are tangibly embodied in a non-transient computer-readable medium, e.g., data storage device 1120, which could include one or more fixed or removable data storage devices, such as a zip drive, floppy disc drive 1124, hard drive, CD-ROM drive, tape drive, etc. Further, the operating system 1108 and the computer program 1110 are comprised of computer program instructions which, when accessed, read and executed by the computer 1102, cause the computer 1102 to perform the steps necessary to implement and/or use the present invention or to load the program of instructions into a memory, thus creating a special purpose data structure causing the computer to operate as a specially programmed computer executing the method steps described herein. Computer program 1110 and/or operating instructions may also be tangibly embodied in memory 1106 and/or data communications devices 1130, thereby making a computer program product or article of manufacture according to the invention. As such, the terms "article of manufacture," "program storage device," and "computer program product," as used herein, are intended to encompass a computer program accessible from any computer readable device or media.

Of course, those skilled in the art will recognize that any combination of the above components, or any number of different components, peripherals, and other devices, may be used with the computer 1102.

Conclusion

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

In view of the above, embodiments of the invention provide a methodology to produce reliable damage proxy maps of building collapse using InSAR coherence. The standard differencing of InSAR coherence requires that two interferometric pairs have almost the same perpendicular and temporal baselines [15]. Embodiments of the invention relaxed this requirement by introducing a robust histogram matching algorithm, which modifies the histogram of the slave pair coherence, so it becomes statistically identical to the master pair coherence. The histogram matching eliminates the bias in coherence difference, which enables the application of a causality constraint, multi-looking of coherence difference maps, and unbiased time series analysis of coherence change.

To validate the methodology, it was applied to a building demolition site in downtown Pasadena, Calif. The results show that the methodology increased the SNR of the test site by about 150% on average compared to simple differencing of coherence. The time series of coherence difference clearly shows that the signal strength of the demolition project increases with time, resulting in an increase in SNR for the test site of about 100 relative to before the demolition.

Other demolition and construction sites were also detected in Pasadena with high fidelity. The change in each site was verified with Google Earth™ optical images. A wide range of the building project size was detected, including a few blocks of apartment complex, partial college campus remodeling, and a room addition project of a single-family residential structure.

InSAR missions may also have shorter repeat cycles, thereby enabling denser time series analysis and more reliable damage proxy maps. Higher resolution SAR data and DEMs and airborne capability will produce higher resolution DPMs, and different radar wave frequencies are expected to have different sensitivity. Further, with an understanding and characterization of the temporal behavior of the ground scatterers, better sensitivity and improved robustness may be achieved while minimizing the false alarm rate.

The methodology is not limited to building damage due to earthquakes. As long as a pre-damage (master) interferometric pair maintains reasonable coherence, the methodology can be applied to any type of natural or anthropogenic damage that causes significant surface property change.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

REFERENCES

[1] G. P. Hayes, R. W. Briggs, a. Sladen, E. J. Fielding, C. Prentice, K. Hudnut, P. Mann, F. W. Taylor, a. J. Crone, R. Gold, T. Ito, and M. Simons, "Complex rupture during the 12 Jan. 2010 Haiti earthquake," *Nature Geoscience*, vol. 3, no. 10, pp. 1-6, October 2010.

[2] M. Talebian, E. Fielding, et al., "The 2003 Bam (Iran) earthquake: Rupture of a blind strike-slip fault," *Geophysical Research Letters*, vol. 31, no. 11, pp. 2-5, 2004.

[3] National Police Agency of Japan, Emergency Disaster Countermeasures Headquarters, "Damage situation and police countermeasures associated with 2011 tohoku district-off the pacific ocean earthquake, May 16, 2012," May 2012.

[4] M. Simons, S. Minson, A. Sladen, F. Ortega, J. Jiang, S. Owen, L. Meng, J.-P. Ampuero, S. Wei, R. Chu, D. Helmberger, H. Kanamori, E. Hetland, A. Moore, and F. Webb, "The 2011 Magnitude 9.0 Tohoku-Oki Earthquake: Mosaicking the Megathrust from Seconds to Centuries," *Science*, vol. 332, pp. 1421-1425, 2011.

[5] DLR-ZKI, Charter Call ID 288, SAFER Action N. 24, Glide No. EQ-2010-000009-HI, Product No 25-A, Scale 1:25,000, "Haiti-Port-au-Prince earthquake map sheet overview-east damage assessment," 2010.

[6] F. Dell'Acqua, C. Bignami, M. Chini, G. Lisini, D. A. Polli, and S. Stramondo, "Earthquake damages rapid mapping by satellite remote sensing data: L'aquila Apr. 6, 2009 event," *IEEE Journal of Selected Topics in Applied Earth Observation and Remote Sensing*, vol. 4, no. 4, pp. 935-943, 2011.

[7] S. Ghosh, C. K. Huyck, M. Greene, S. P. Gill, J. Bevington, W. Svekla, R. DesRoches, and R. T. Eguchi, "Crowdsourcing for rapid damage assessment: The global earth observation catastrophe assessment network (geo-can)," *Earthquake Spectra*, vol. 27, no. 1, pp. S179-S198, 2011.

[8] N. Kerle. (2011, March) "Remote sensing based post-disaster damage mapping—ready for a collaborative approach?" IECO/IEEE-Earthzine, URL: http://www.earthzine.org/2011/03/23/remote-sensing-basedpost-disaster-damage-mapping-%E2%80%93-ready-for-acollaborative-approach.

[9] D. Brunner, S. Member, G. Lemoine, S. Member, and L. Bruzzone, "Earthquake Damage Assessment of Buildings Using VHR Optical and SAR Imagery," *IEEE Transactions on Geoscience and Remote Sensing*, vol. 48, no. 5, pp. 2403-2420, 2010.

[10] R. Guida, A. Iodice, D. Roccio, and U. Stilla, "Model-based interpretation of high-resolution SAR images of buildings," *IEEE Journal of Selected Topics in Applied Earth Observation and Remote Sensing*, vol. 1, no. 2, pp. 107-119, 2008.

[11] S. Auer, S. Hinz, and R. Bamler, "Ray-tracing simulation techniques for understanding high-resolution SAR images," *IEEE Transactions on Geoscience and Remote Sensing*, vol. 48, no. 3, pp. 1445-1456, 2010.

[12] H. Zebker, P. A. Rosen, S. Hensley, and P. J. Mouginis-Mark, "Analysis of active lava flows on Kilauea volcano, Hawaii, using sir-c radar correlation measurements," *Geology*, vol. 24, no. 6, pp. 495-498, 1996.

[13] H. R. Dietterich, M. P. Poland, D. A. Schmidt, K. V. Cashman, D. R. Sherrod, and A. T. Espinosa, "Tracking lava flow emplacement on the east rift zone of Kilauea, Hi., with synthetic aperture tracking lava flow emplacement on the east rift zone of Kilauea, Hi., with synthetic aperture radar coherence," *Geochemistry, Geophysics, Geosystems*, vol. 13, no. 5, 2012.

[14] M. Simons, Y. Fialko, and L. Rivera, "Coseismic deformation from the 1999 mw 7.1 hector mine, California, earthquake as inferred from INSAR and GPS observations," *Bulletin of the Seismological Society of America*, vol. 92, no. 4, pp. 1390-1402, 2002.

[15] E. J. Fielding, M. Talebian, P. A. Rosen, H. Nazari, J. A. Jackson, M. Ghorashi, and R. Walker, "Surface ruptures and building damage of the 2003 Bam, Iran, earthquake mapped by satellite synthetic aperture radar interferometric correlation," *J. Geophys. Res.*, vol. 110, no. B3, p. B03302, 2005.

[16] J. Hoffmann, "Mapping damage during the Bam (Iran)) earthquake using interferometric coherence," *International Journal of Remote Sensing*, vol. 28, no. 6, pp. 1199-1216, 2007.

[17] F. Gatelli, A. M. Guarnieri, F. Parizzi, P. Pasquali, C. Prati, and F. Rocca, "The wave-number shift in SAR interferometry," *IEEE Transactions on Geoscience and Remote Sensing*, vol. 32, no. 4, pp. 855-865, July 1994.

[18] H. A. Zebker, S. Member, and J. Villasenor, "Decorrelation in Interferometric Radar Echoes," *IEEE Transactions on Geoscience and Remote Sensing*, vol. 30, no. 5, pp. 950-959, 1992.

[19] W. Hoen and H. Zebker, "Penetration depths inferred from interferometric volume decorrelation observed over the Greenland Ice Sheet," *IEEE Transactions on Geoscience and Remote Sensing*, vol. 38, no. 6, pp. 2571-2583, 2000.

[20] R. Hanssen, *Radar Interferometry: Data Interpretation and Error Analysis,* 1st ed. Springer, 2001.

[21] M. Lavalle, M. Simard, and S. Hensley, "A temporal decorrelation model for polarimetric radar interferometers," *IEEE Transactions on Geoscience and Remote Sensing*, vol. PP, no. 99, pp. 1-9, 2011.

[22] P. A. Rosen, S. Hensley, I. R. Joughin, F. K. Li, S. N. Madsen, E. Rodriguez, and R. M. Goldstein, "Synthetic Aperture Radar Interferometry," *Proceeding of the IEEE*, vol. 88, no. 3, pp. 333-382, 2000.

[23] M. Simons and P. A. Rosen, "Interferometric synthetic aperture radar geodesy," *Treatise on Geophysics: Geodesy*, vol. 3, pp. 391-446, 2007.

[24] P. A. Rosen, S. Hensley, G. Peltzer, and M. Simons, "Updated Repeat Orbit Interferometry package released," *Eos Trans. AGU*, vol. 85, no. 5, p. 35, 2004.

[25] D. Coltuc, P. Bolon, and J.-M. Chassery, "Exact histogram specification." *IEEE transactions on image processing: a publication of the IEEE Signal Processing Society*, vol. 15, no. 5, pp. 1143-52, May 2006.

[26] P. A. Rosen, S. Hensley, K. Wheeler, G. Sadowy, T. Miller, S. Shaffer, R. Muellerschoen, C. Jones, H. Zebker, and S. Madsen, "UAVSAR: a new NASA airborne SAR system for science and technology research," *IEEE Radar Coherence, 2006.*

[27] C. Corbane, K. Saito, L. Dell'Oro, E. Bjorgo, S. P. D. Gill, B. E. Piard, C. K. Huyck, T. Kemper, G. Lemoine, R. J. S. Spence, R. Shankar, O. Senegas, F. Ghesquiere, D. Lallemant, G. Evans, R. A. Gartley, J. Toro, S. Ghosh, W. D. Svekla, B. J. Adams, and R. T. Eguchi, "A comprehensive analysis of building damage in the 12 Jan. 2010 Mw 7 Haiti earthquake using high-resolution satellite and aerial imagery," *Photogrammetric Engineering and Remote Sensing*, vol. 77, no. 10, pp. 997-1009, 2011.

[28] E. Booth, K. Saito, R. Spence, G. Madabhushi, and R. T. Eguchi, "Validating assessments of seismic damage made from remote sensing," *Earthquake Spectra*, vol. 27, no. S1, pp. S157-S177, 2011.

What is claimed is:

1. A computer-implemented method for generating a damage proxy map, comprising:
    receiving first radar signals for an area prior to a damage event;
    obtaining, based on the first radar signals, a master coherence map for the area prior to the damage event;
    receiving second radar signals for the area spanning the damage event;

obtaining, based on the second radar signals, a slave coherence map for the area including the damage event;

registering the slave coherence map to the master coherence map;

modifying pixel values of the slave coherence map using histogram matching, wherein a first histogram of the master coherence map exactly matches a second histogram of the slave coherence map;

computing a coherence difference between the modified slave coherence map and the master coherence map to produce a damage proxy map; and displaying the damage proxy map, wherein the coherence difference is displayed in a visually distinguishable manner.

2. The method of claim 1, wherein the master coherence map and slave coherence map are obtained from an interferometric synthetic aperture radar (InSAR) without ground truth validation.

3. The method of claim 1, wherein:

the master coherence map comprises a first pair of interferometric coherence maps;

the slave coherence map comprises a second pair of interferometric coherence maps; and three (3) InSAR images are used to create the first pair and the second pair of interferometric coherence maps.

4. The method of claim 1, wherein the slave coherence map is registered to the master coherence map using cross-correlation of amplitude images.

5. The method of claim 1, further comprising performing unbiased time series analysis of coherence change.

6. The method of claim 1, further comprising:

suppressing background clutter by applying a causality constraint to the damage proxy map.

7. The method of claim 1, further comprising:

transforming the damage proxy map onto a georeferenced coordinate system; and overlaying the transformed damage proxy map onto a map/geographic information program based on the georeferenced coordinate system.

8. The method of claim 1, further comprising:

assessing and performing emergency rescue operations based on the damage proxy map.

9. An apparatus for generating a damage proxy map in a computer system comprising:

(a) a computer having a memory; and (b) an application executing on the computer, wherein the application is configured to:

(1) receive first radar signals for an area prior to a damage event;

(2) obtain, based on the first radar signals, a master coherence map for the area prior to the damage event;

(3) receive second radar signals for the area spanning the damage event;

(4) obtain, based on the second radar signals, a slave coherence map for the area including the damage event;

(5) register the slave coherence map to the master coherence map;

(6) modify pixel values of the slave coherence map using histogram matching, wherein a first histogram of the master coherence map exactly matches a second histogram of the slave coherence map;

(7) compute a coherence difference between the modified slave coherence map and the master coherence map to produce a damage proxy map; and (8) display the damage proxy map, wherein the coherence difference is displayed in a visually distinguishable manner.

10. The apparatus of claim 9, wherein the master coherence map and slave coherence map are obtained from an interferometric synthetic aperture radar (InSAR) without ground truth validation.

11. The apparatus of claim 9, wherein:

the master coherence map comprises a first pair of interferometric coherence maps;

the slave coherence map comprises a second pair of interferometric coherence maps; and three (3) InSAR images are used to create the first pair and the second pair of interferometric coherence maps.

12. The apparatus of claim 9, wherein the slave coherence map is registered to the master coherence map using cross-correlation of amplitude images.

13. The apparatus of claim 9, wherein the application is further configured to perform unbiased time series analysis of coherence change.

14. The apparatus of claim 9, wherein the application is further configured to suppress background clutter by applying a causality constraint to the damage proxy map.

15. The apparatus of claim 9, wherein the application is further configured to:

transform the damage proxy map onto a georeferenced coordinate system; and overlay the transformed damage proxy map onto a map/geographic information program based on the georeferenced coordinate system.

16. The apparatus of claim 9, wherein the application is further configured to:

provide an assessment of emergency rescue operations based on the damage proxy map.

* * * * *